Oct. 17, 1939.   H. CREGAR   2,176,606
COMBINED DRILLING AND TAPPING UNIT
Filed Nov. 6, 1937   5 Sheets-Sheet 5

Inventor
Howard Cregar
By Williams, Bradbury, McCaleb & Hinkle
Attys.

Patented Oct. 17, 1939

2,176,606

UNITED STATES PATENT OFFICE 2,176,606

COMBINED DRILLING AND TAPPING UNIT

Howard Cregar, Richmond, Ind., assignor to The National Automatic Tool Company, Richmond, Ind., a corporation of Indiana Application November 6, 1937, Serial No. 173,065

15 Claims. (Cl. 10—128)

The invention relates to machining devices and more particularly to a combined drilling and tapping unit.

The conventional practice has been to employ successively two separate and independent machines to perform drilling and tapping operations upon a single work piece, and, although it has long been desirable to save floor space and shop time by having available a single machine for doing both of the operations simultaneously instead of two machines doing the two operations successively, yet the conventional practice of using two machines with two successive operations has long persisted due to the fact that in these two operations such factors as the work feed rates, for example, among other things, are so widely different and based upon conflicting variations of other factors such as timing, speed, tool size and the characteristics of work material, that any endeavor to combine the two operations in one machine has met with heretofore unsurmounted difficulties.

Consequently, one of the objects of the invention is to provide a power tool unit performing two machining functions of widely different characteristics simultaneously in one operation.

Another object of the invention is to provide a combined drilling and tapping unit for use in automatic tools.

Another object of the invention is to provide a machining unit performing drilling and tapping operations simultaneously.

Another object of the invention is to provide a combined drilling and tapping device wherein the drill feed is freed of any tap feed restraints.

Another object of the invention is to provide a single automatic control for drilling and tapping operations performed simultaneously.

Another object of the invention is to maintain the independency of two machining functions performed in a single operation.

Another object of the invention is to provide a power tool unit independently performing a machining function involving a definite work-feed rate and a machining function involving a different work-feed rate in a single coordinated operation.

Another object of the invention is to provide a machining device performing two machining operations simultaneously along axes lying in planes intersecting at angles as large as 90°.

Another object of the invention is to carry an independent lead screw tapping spindle group on a hydraulic drill head for independent but simultaneous operation therewith.

Another object of the invention is to employ the same traversing mechanism for independently functioning drills and taps operating simultaneously.

Another object of the invention is to provide a combined drilling and tapping machine traversing in one plane and feeding in another plane at an angle with respect to the first plane.

Another object of the invention is to provide a device of the class described, which is simple in construction and operation, effective in its use, and inexpensive to manufacture, install and maintain.

These being among the objects of the invention, other and further objects will become apparent from the drawings herein, the description relating thereto, and the appended claims, these and other objects being contemplated.

Referring now to the drawings.

Figure 1:
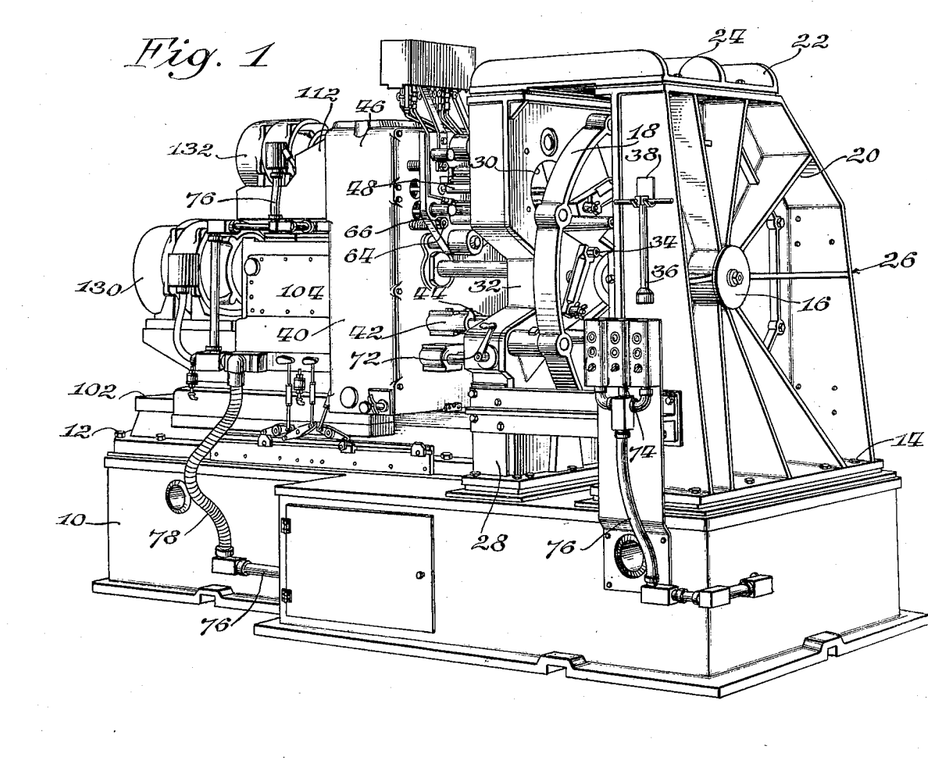
Fig. 1 is an elevation of a preferred embodiment of the invention illustrated in perspective.

The preferred embodiment of the invention illustrated will be better comprehended when it is understood that a horizontally moving driller box 104 is supported for reciprocal movement upon a bed 100 having ways 102. The bed 100, in turn, is secured to a base 10 at one end thereof, as by bolts 12. At the other end of the base and fixed thereto as by bolts 14, are secured two upright and horizontally spaced walls 26 and 28 which rotatably support between them as at 16 a work supporting and indexing table 18.

The walls 26 and 28 are suitably reinforced as by structural ribs 20 integral therewith and an overhead interconnecting member 22 bolted thereto as at 24. The wall 26 is the one farthest removed from the drill box when the drilling operation is in progress. The wall 28 provides an intermediate wall for bracing and other purposes and is suitably apertured as at 30 to permit access of the drills to the work supported upon the indexing table 18. In addition to this, the intermediate wall is offset at 32 to provide a station at which the finished work parts may be removed and unfinished work parts attached to the working table as by suitable bolts 34 manually driven by the speed wrench 36 which is carried conveniently nearby the station 32 on the buttress 26 by the bracket 38.

Figures 2, 3:
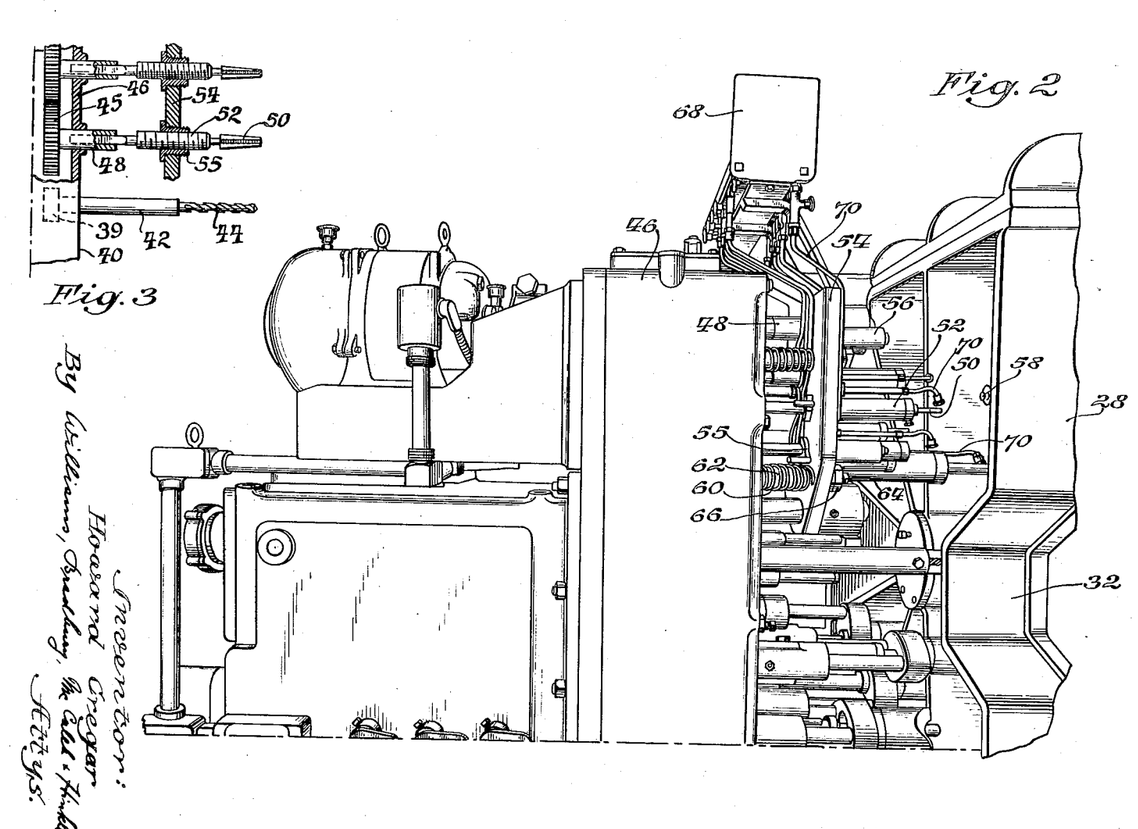
Fig. 2 is an enlarged perspective side elevation of a portion of the embodiment illustrated in Fig. 1 showing the traversing unit.
Fig. 3 is a diagrammatical view of the tap feed employed in said embodiment.

The drill box 104 is provided with suitable gears 39 as better illustrated in Fig. 3, in the cluster box 40 to convey the torque of the drill motor 130 to the drill spindles 42 and the drills 44 supported thereby. The drill box 104, directing the drills 44 through the apertures 30 to engage the work parts to be machined, is advanced from its resting position to its working station by suitable hydraulic drive (diagrammatically represented in Fig. 8) which additionally serves as a feed for the drills upon further movement of the drill box 104 beyond its working station. This hydraulic feed relation is well known in the art and in referring to Fig. 8 it will be seen that a piston 224 is employed as reciprocated in cylinder 226 to move the rod 228 which is connected to the drill box 104. A spool valve chest assembly 230 is controlled by solenoids 158 and 160 as more particularly described hereinafter, and regulates the pressure flow of oil from the pump 232 and the discharge flow of oil from the cylinder 226. The discharge flow is directed to the reservoir 234, and a relief valve 236 is provided on the pressure side of the pump 232 to control the speed and the feed pressure during the traversing movement of the drill box 104 in a suitable and well-known manner, provided, however, that it be appreciated that the feed rate is determined and maintained according to the requirements of the drills being used in the drilling operation.

The tapping operation coordinated for independent operation with the drilling function is accomplished through a tap box 112 located on top of the drill box 104 and movable therewith by the same traversing movement. The tap box 112 is driven by a tap motor 132 through suitable gears 45 contained in the cluster box 46 which drives the tap shanks 48. Tap spindles 52 carrying taps 50 are mounted upon the shanks 48 for positive rotation therewith. However, the tap spindles are free to move axially relative to the shanks 48 between wide limits.

This axial movement makes it possible for the feed rate of the tap spindles to be controlled independently of the feed rate of the drill box. This independent feed rate of the taps is accomplished by a feed plate 54 supported on the tap box 112 by rods 62 secured at one end to the tap box 112 and carrying a compression spring 60 intermediate the tap box and the plate 54 which resiliently presses the plate away from the tap box and against the nuts 66 terminally carried by the threaded end portion 64 of the rod 62.

The plate 54 in turn carries individual feed nuts 55 for the spindles 52 which in turn have a helical thread mating therewith which upon the cutting rotation of the tap 50 continually advances the tap the required distance.

In order to provide a positive feed relationship between the taps and the work parts to be tapped, the plate 54 comes to rest against the apertured wall 28 when the forward traverse of the drill box reaches a certain point. This position of the plate is determined by spacing lugs 56 which engage in positioning sleeves 58 carried by the apertured wall and thereafter the plate 54 is resiliently held in its determined position by the compression spring 60 which absorbs the differential in feed rates existing between the drill box and the tapper. In this way, the feed rate for the taps is carried on independently of any feeding movements of the drill box.

In this connection it will be observed that the various feed nuts and their respective mating members on the tap spindles 52 are so formed and fashioned individually as to take care of their different and respective tap requirements, if such requirements happen to exist. All the taps in this particular embodiment of the invention receive a predetermined number of revolutions and the linear feed requirements of each particular tap are supplied by the particular constructions of the nut 55 and spindle 52 driving it. This is arranged so that taps of different thread pitches can be used with the tap box shown, and the differential in feed rates between different taps is absorbed or accommodated in the nut and spindle relationship of each tap. In this way, upon the single traverse of the drill box, the tapper is positioned to operate simultaneously therewith in a coordinated manner independent of the drilling operation.

Due to the fact that cutting edges of drills and taps need coolant or cutting oil, a coolant reservoir is provided at 68 and carried on top of the driller box assembly from whence coolant is fed by force through pipe 70 to the cutting edges of the tools, in the conventional manner, from where the coolant drops to a collector, or drain sump (not shown) from whence it is returned to the reservoir by a suitable motor driven pump operated in conjunction with the drill and tap motors.

Suitable means controlled in part by the crank 72 is employed to bring about the rotation and indexing of the table 18 after each machining operation. It will be observed that the electrical switches indicated generally at 74 and more specifically described hereinafter are conveniently positioned near the operator. These switches are in circuit with wires by rigid armored pipes 76 carried to the respective power and control units where no relative movement is present between units and flexible armored cable 78 where relative movement exists between the units connected.

Figure 4:
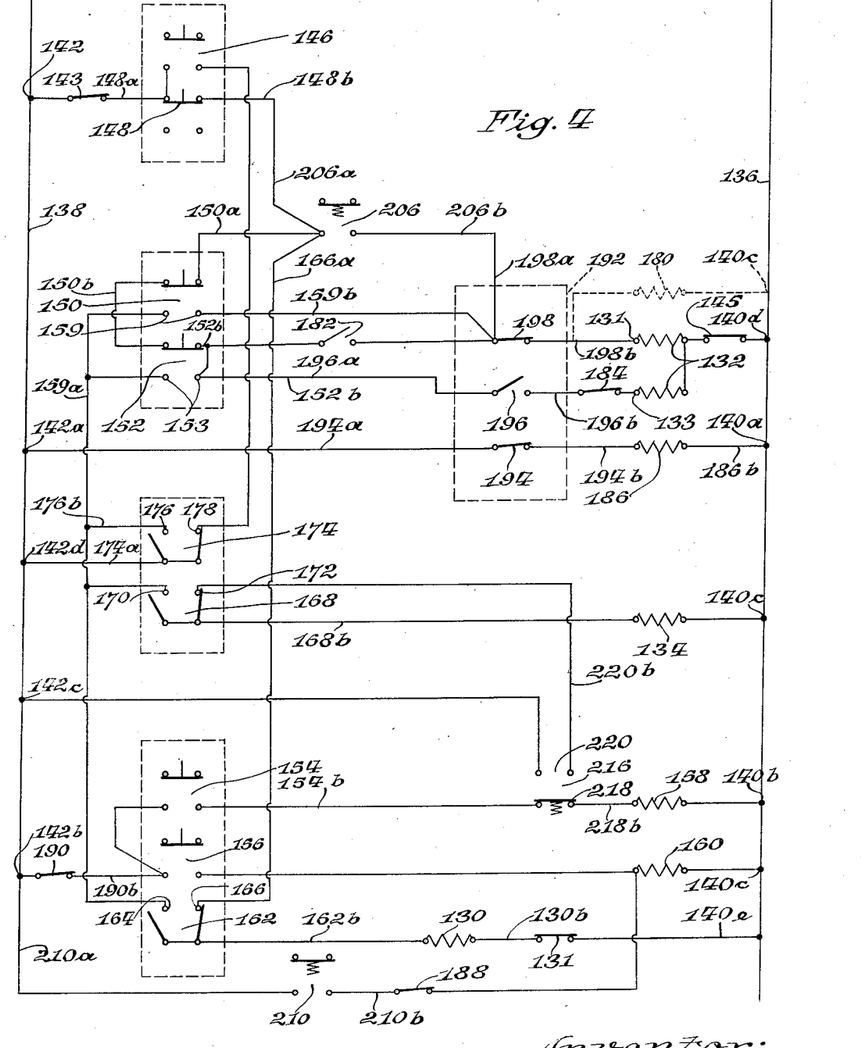
Fig. 4 is a diagrammatical illustration of the electrical control circuits employed forming a part of the invention.
Figure 5:
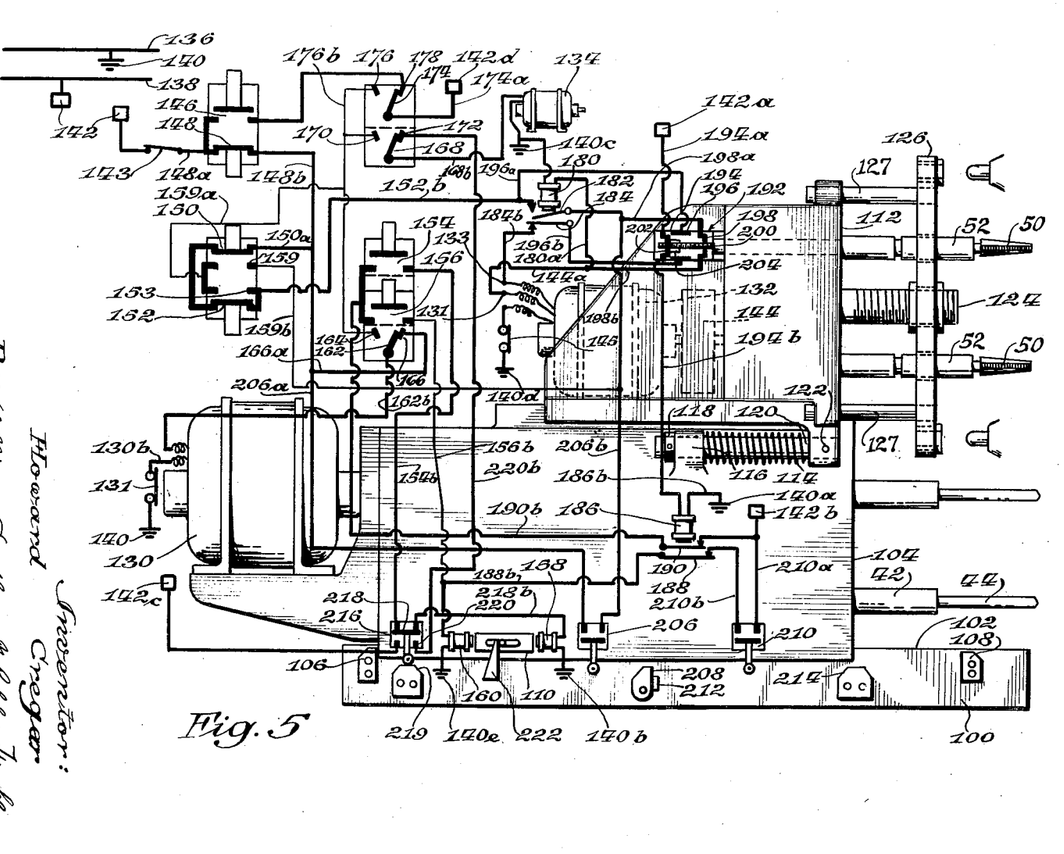
Fig. 5 is a partially diagrammatical illustration of the electrical equipment forming a part of a modified form of the invention.

The control and operation of the invention may be better understood with reference to Figs. 4 and 5 wherein the various functions heretofore described and related are controlled through electrical circuits for either full-automatic operation in which various functions are synchronized according to a predetermined pattern, or for manual control of each function separately.

The particular apparatus with which the electrical circuits are associated in Fig. 5 constitutes another modification of the invention. Here a back stop 106 and a forward stop 108, either or both of which may be adjustable, is illustrated as secured to the bed 100 to serve as limits for the over-all traversing movement of the drill box.

In this particular embodiment, the tap box 112 reciprocates horizontally upon the drill box 104 in a manner similar to that in which the drill box 104 is carried by the bed 100 and ways 102.

In this instance the relative movements of the two boxes is controlled by an expansion spring 114 which, under resting conditions of the apparatus, urges the tap box 112 to its advanced position as determined by a limit provided by the boss 116 integral with the drill box 104, wherein the boss 116 is engaged by a lock collar 118 carried by a rod 120 which in turn is secured to the tap box 112 by a pin 122.

In addition to these modifications, the feed rate of the taps is controlled by a master lead screw 124 driven from the tap gears 45 and engaging the lead plate 126 directly. The lead plate 126 is directed by guides 127 and positioned against the apertured wall 28 under the force of the expansion spring 114 when the drill box is moved forward. Thereafter, the feed of the taps 50 is accomplished by the master lead screw 124 permitting the distance between the tap box 112 and the lead plate 126 to be gradually reduced, whereby the tap box 112, under the force of the spring 114, advances in a manner feeding the taps into the work. With this particular feed rate modification, taps having threads of different pitches are accommodated by changing the relative gear ratios and thereby the speed of rotation to a degree whereby the feed rate of each tap is constant and the speed of rotation varied according to the requirements of the several taps.

Figures 6, 7, 8:
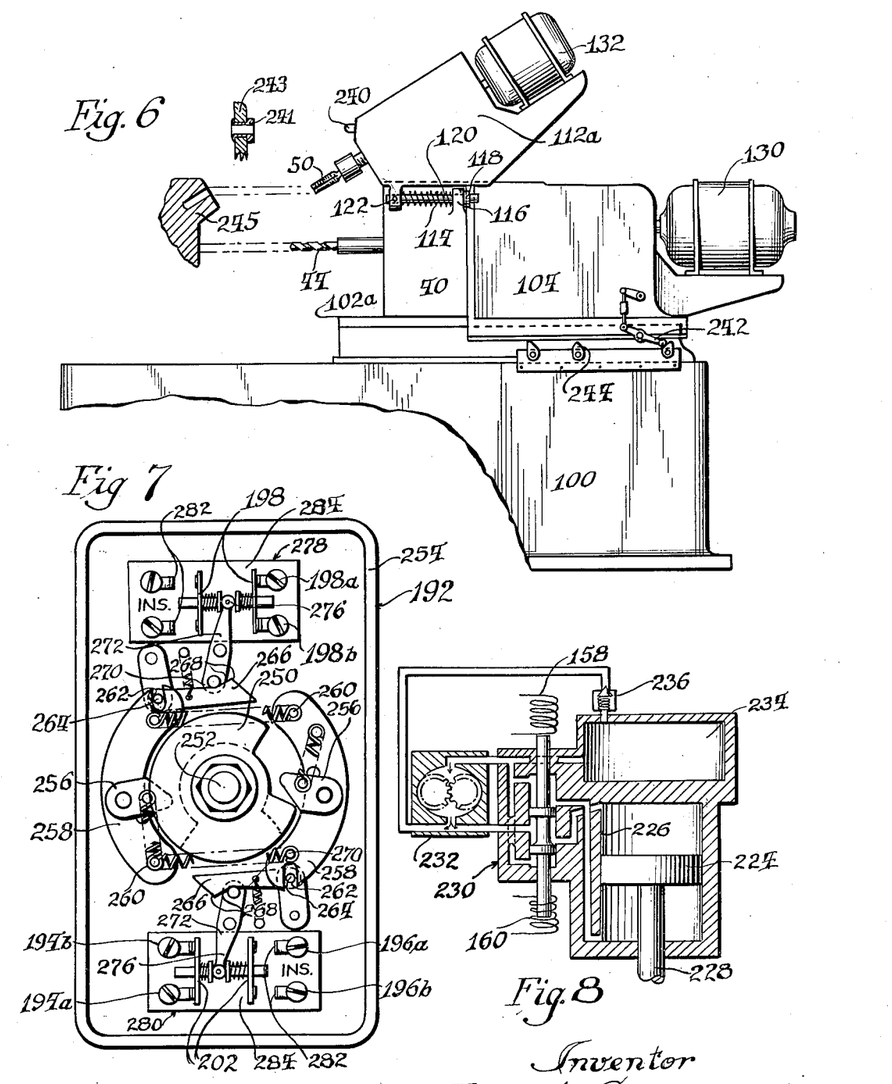
Fig. 6 is an elevation, partly in section of another embodiment of the invention.
Fig. 7 is a plan view of an improved control employed in the invention.
Fig. 8 is a partly diagrammatical plan sectional view illustrating another control for the invention.

Referring to Fig. 6 in this connection, it will be observed that an embodiment of the invention is illustrated which is capable of simultaneously drilling and tapping holes whose axes are disposed at an angle relative to each other. In this embodiment, the tap head 112a is positioned to tap in a direction angled relative to the direction of the traversing movement of the drill head or cluster box 40. The stud 240 is provided on the tap head and engages in the positioning sleeve 241 which is mounted on a fixed member 243 at or approximate to the forward limit of a rapid traverse movement, this being determined by the engagement between the hydraulic valve control 242 and the cam face of the dog 244. Thereafter the tap 50 is fed into the work 245 at its own feed rate and the drilling operation proceeds simultaneously without interfering therewith. The spring 114 absorbs the differential between the feed rates and it will be observed that the angle between the holes can be as large as 90°, in fact, larger than that, provided the tap 50 clears the work in traversing.

Other than the above numerals applied to the modified constructions, the parts shown in Fig. 5, which correspond to parts already described, bear corresponding numbers and further reference thereto hereinafter is made without repeating the descriptions thereof already made herein.

The electrical power units employed in the invention, as more particularly shown in Fig. 5, comprise the drill motor 130, a reversing tap motor 132 having a forward pole 131 and a reversing pole 133, a coolant feed motor 134 and main power lines 136 and 138, the former of which is represented by a "ground" symbol 140 and the latter by a square 142 throughout the wiring diagram.

The main electrical control units employed in the apparatus for the electrical circuits and the power units comprise a magnetic brake 144 for the tap motor 132; manually actuated contactor control switches for the drill motor comprising a starter switch 146 and a stop switch 148; manually actuated contactor control switches for the tap motor comprising a forward switch 150 and a reverse switch 152, each having a four-pole two-circuit, two-position construction; a forward switch 154 and a reverse switch 156, of a manually actuated two-pole contactor control construction, for controlling the forward and reverse solenoids 158 and 160, respectively, of the control valve 110 for the traverse movement of the drill box 104; a manual selector switch 162 for the drill motor 130 having a "hand" position or pole 164 and an "automatic" position 166; a manual selector switch 168 for the coolant motor 134 having a "hand" position 170 and an "automatic" position 172; a master selector switch 174 for all the circuits having a "hand" position 176 and an "automatic" position 178; a relay 180 controlling two switches, one, 182, normally open and the other, 184, normally closed; a relay 186 controlling two switches 188 and 190, both of which are normally open; and a rotary limit switch 192 for the tap motor having three operation switches, the first of which 194 is closed only when the taps are in fully withdrawn position, a second switch 196 which is open only when the first switch is closed, and a third switch 198 which is opened only when the taps reach their forward limit.

The rotary limit switch 192 is illustrated diagrammatically in Fig. 5 of the drawings where it is driven by a worm 200 which in turn is rotated positively with the rotation of the taps 50. Referring now to Fig. 7 where the construction of the rotary limit switch is shown with more particularity, the rotary limit switch 192 comprises two cam segments 250 adjustably mounted upon the worm driven shaft 252 in the switch box 254 for engaging one way dogs 256 that are carried by levers 258 which in turn are pivoted at 260 and adapted to be lifted when the cam segments 250 actuate the dogs 256. The free ends of the levers 258 are slotted as at 262 to receive pins 264 therein which are mounted on snap-over arms 266 so as to reciprocate the arms 266 longitudinally thereof in conjunction with the lifting and lowering movements of the levers 258. The snap-over arms 266 in turn are provided with converging incline faces 268 which are spring pressed against one end 270 of centrally mounted snap levers 272 whereby movement of the levers 258 are translated to the snap levers 272 when the ends 270 of the snap levers ride up and over the apex of the inclined faces at the time the levers 258 are moved from one of their limits to the other. The other ends 276 of the snap levers 272 operate to reciprocate the contacts 198 and 202 of the switches 278 and 280 respectively in a well-known manner.

The poles 282 and the contacts 198 and 202 are mounted upon insulated panels 284 secured to the switch box 254 whereby they are insulated from the rest of the box and from each other, and the remaining parts, particularly the cam segments 250 are made of steel or wear resisting material so that a rotary limit switch simple in construction and operation and of increased longevity is provided as distinguished from the conventional practice wherein frictionally engaging and articulated parts have of necessity been made of insulating material not capable of withstanding or sustaining hard and long use. It has also been the conventional need to use an insulating material for its insulating properties in places where otherwise it was subjected to weakening strains and stresses. Consequently, it will be appreciated that the improved rotary limit switch provided by the invention is more rugged, more compact and of increased longevity over limit switches heretofore employed in the art.

The mechanical control units employed in the apparatus for the electrical circuits comprise a normally open single-circuit switch 206 carried by the drill box 104 and momentarily closed by a one-way dog 208 held by a stop 212 on the bed 100 after the lead screw plate 126 is positioned against the locating pins or sleeves 58; a normally open single circuit switch 210 carried by the drill box 104 and closed by the incline 214 on the bed 100 when the drills 44 have reached their required depth in the work; and a two-position two-circuit switch 216 carried by the drill box 104 and actuated by the incline 219 on the bed 100 in which the switch 218 is normally open, the switch 220 is normally closed and their respective positions are reversed when the drill box leaves its retracted position.

The preferable and general scheme of operation for the apparatus illustrated is according to the following pattern wherein the drill box is moved forward and the coolant started so that the drills will commence their work. Simultaneously therewith or shortly thereafter the lead screw plate takes its position against the locating pins and the tap motor is started with the master lead screw feeding the taps to their required depth. When the taps reach their predetermined limit the tap motor is reversed and runs until its starting position is reached, whereupon the tap motor is relieved of electrical power and the magnetic brake stops further movement of the taps to prevent them from overrunning their starting position. The drill box and tap box are then retracted, the coolant turned off and the apparatus made ready for a change of work and the repetition of the cycle.

The diagram in Figs. 4 and 5 shows the selectors 162, 168 and 174 and respective switches in automatic position with the unit stopped in retracted position. The circuits employed in automatic operation are shown in Fig. 5 in dark lines and the circuits devoted to "hand" operations are shown in light lines.

The first step is for the operator to determine whether or not he wants to run the device with the drill motor going all the time, or to cut it off between each operation. He is provided this choice in the event work is supplied at short or long intervals, i. e., at intervals determining whether or not it is more profitable to run the drill motor continually and save starting current consumption or to stop the motor after each operation to obviate long periods of needless running and wear and tear on the machinery. If continuous running of the drill motor is selected, then the switch 143 is thrown in and the start-stop switches 146, 148 are not touched except to place them in "Start" position, as shown in the diagram. If, however, manual control of the drill motor is desired, whether for automatic or hand operation, then switch 143 is left open and switches 146 and 148 used exclusively. However, in the particular arrangement shown, the drill motor is continually running as supplied by power through the circuit starting at terminal 142 through switch 143, line 148a, closed switch 148, line 148b, line 166a, switch 162, line 162b, the drill motor 130, line 130b including the overload cutout 131, and terminal 140. The switch 194 of the rotary limit switch 192 is closed, energizing relay 186 from terminal 142a through line 194a, switch 194, line 194b, relay 186 and line 186b to the terminal 140a whereby switches 188 and 190 are closed.

When the forward traverse switch 154 is closed to commence the cycle of operation, the solenoid 158 is energized to move the valve 110 to forward position. This is accomplished through the circuit beginning with the terminal 142b, running through switch 190, line 190b, switch 154, line 154b, switch 218 closed by incline 219, line 218b, and the solenoid 158 to the terminal 140b. The forward movement of the unit is thereby commenced.

As the drill box 104 moves forward the position of the switch 216 is changed. The valve 110 having been moved to its forward position where it retains its position, the switch 218 supporting that circuit breaks and the switch 220 is closed by its contact with the incline 219 being relinguished. When the switch 220 closes, it starts the coolant motor 134 through the circuit starting at terminal 142c, through switch 220, line 220b, selector switch 168 and line 168b, the motor 134 to the terminal 140c. Coolant is then supplied to the drills 44 and taps 50.

Shortly thereafter, at about the time the lead screw plate 126 is fully seated against the guide pins 58, the switch 206 is momentarily closed by the dog 208 as already described. This starts the forward movement of the tap motor 132 by establishing a circuit running from terminal 142 through switch 148, line 148b, line 206a, switch 206, line 206b, line 198a, switch 198, line 198b, line 144a, to pole 131, through the motor 132 to the terminal 140d, including an overload switch 145. At the same time this circuit is completed, another circuit is completed with relay 180, from the line 198b, above mentioned, through line 180a to the terminal 140c. This last circuit energizing the relay 180 causes an opening of the switch 184 to prevent any possibility of a reversal of the tap motor while the "forward" circuit is closed. The relay 180 also closes switch 182 which establishes a holding circuit to take the place of the circuit closed by switch 206 when switch 206 breaks after passing over the dog 208. This holding circuit runs from the terminal 142, line 148a, switch 148, line 148b, line 150a, switches 150 and 152, line 152b, switch 182 and from there to line 198a, and from thereon, as already described, through switch 198 and motor 132 to the terminal 140d.

When the tap motor 132 starts, the rotary limit switch 194 breaks, enervating relay 186 and permitting switches 188 and 190 to break. Break'ıg of switch 188 renders the reversing solenoid 160 inoperative and "safe" against inadvertent touching of the manual switch 156, also against actuation by the switch 210 before the tapping operation is completed. However, switch 210 is closed by incline 214 when the driller has completed its work so that this circuit is made ready for actuation as subsequently described.

With the breaking of rotary limit switch 194, the rotary limit switch 196 is closed, but is otherwise electrically inoperative because the switch 184 in its circuit is held open by the relay 180. However, when the tapping operation is completed, the rotary switch 198 supporting the relay 180 and the forward turning of the tap motor breaks, and with the enervating of the relay 180, the switch 184 closes, establishing a circuit reversing the tap motor. This reversing circuit runs from the terminal 142, line 148a, switch 148, line 148b, switches 150 and 152, line 152b, line 196a, switch 196, line 196b, switch 184, line 184b, pole 133, the motor 132 and terminal 140d.

When the reverse movement of the tapper starts, the switch 198 recloses to its "ready" position again but without affecting the reverse operation of the unit because the switch 206 which initiated the holding circuit relation of which switch 198 was a part, does not close again since the dog 208 yields on the return movement.

Reverse movement of the tap motor 132 is supported all the way by the switch 196. Then, when the rotary limit switch retracts fully, indicating that the taps are clear of the work and ready for another operation, the switch 196 breaks, enervating the tap motor 132 which is then braked to an immediate stop by the magnetic brake 144 to prevent overrunning. After the switch 196 breaks, the switch 194 is remade and the relay 186 reenergized, closing the switches 188 and 190. Due to the fact that switch 210 is closed by the incline 214 at this time, the closing of the switch 190 energizes the solenoid 160 to draw the valve 110 to reversing position, whereby the drill box is retracted. The circuit energizing the solenoid 160 commences at 142b, runs through line 210a, switch 210, line 210b, switch 188, line 188b, through the solenoid 160 to the terminal 140e.

Retraction of the drill box continues until the dog 222 on the bed 100 engages the valve 110 and moves it to neutral position. By this time the switch 216 has ridden up the incline 219 and opened 220 to close 218. The coolant motor 134 drops out with the breaking of switch 220 and the closing of the switch 218 renders the traverse switch 154 again ready for a manual reclosing to start another cycle as already described.

In the event it becomes desirable to operate the device entirely by hand without benefit of the automatic circuits, or in event some breakdown occurs in the automatic circuits, the device can be operated entirely by hand. In that event all the selectors are turned from "automatic" to "hand" operating positions, to-wit, the switch 174 is moved to engage pole 176, the switch 168 is moved to engage pole 170, and the switch 162 is moved to engage pole 164. This starts the drill motor 130 through the circuit starting at 142d, through line 174a, switch 174—176, line 176b, switch 164—162, line 162b, the motor 130, to terminal 140.

Thereafter, forward traverse of the drill box is accomplished by energizing the forward solenoid 158 through closing the contactor switch 154 which completes a circuit beginning at terminal 142b, and running through switch 190, line 190b, switch 154, line 154b, switch 218, line 218b, solenoid 158 and to terminal 140b. After full advance has been made the same safeguards against inadvertent reverse traverse is provided as with the automatic circuits; switch 218 is broken when contact with the incline 219 is relinquished.

The coolant motor 134 is started by the switch 168—170 being closed in conjunction with the switch 176—174 whereby terminal 142d and terminal 140c are interconnected by a circuit including the motor 134.

The tap motor is started by closing the switch 150 with the poles 159 which completes a circuit beginning at terminal 142d and including line 174a, switch 174—176, line 176b, line 159a, through poles 159, line 159b, line 206b, line 198a, switch 198 which breaks when forward limit of taps is reached, line 198b—144a, pole 131, the forward circuit of the motor 132 to terminal 140d.

This circuit also establishes the holding circuit already described. Reverse of the tap motor after switch 198 breaks, is accomplished by switch 152 contacting poles 153 in which instance the circuit is made from 159a through line 152b, lines 196a, switch 196, line 196b, switch 184, line 184b, to pole 133, through the reverse circuit of the motor 132 to the terminal 140d.

The reverse traverse movement is safeguarded by the relay 186 which is not energized until the rotary limit switch 194 is again closed at full retraction of the taps. When the switch 194 is closed, relay 186 closes switch 190 and thereupon, when switch 156 is closed by hand, the valve reversing solenoid 160 is energized through a circuit starting at the terminal 142b and leading through switch 190, line 190b, switch 156, line 156b, through solenoid 160 to terminal 140c. The dog 222 positions the valve 110 again in neutral position on full retraction and the various steps described can be entered upon once again when the work is changed.

From the foregoing description of the several embodiments of the invention, and their operation, it will be seen that a power tool unit is provided, performing two machining functions of widely different characteristics simultaneously in one operation under either "automatic" or "hand" control at different angles or otherwise, and that the two functions are maintained independently of each other in a manner whereby the variant factors existing with each function are coordinated into one unit, simple in construction and operation, effective in its use and inexpensive to manufacture, install, and maintain.

Consequently, although preferred embodiments of the invention have been shown and described herein, it will be apparent to those skilled in the art that various uses, modifications, and changes may be made therein without departing from the spirit and substance of the invention, the scope of which is commensurate with the appended claims.

What is claimed, is:

1. In a tapping unit having a means for driving a plurality of taps, a single feed mechanism for said taps comprising a lead member, means for locating said lead member relative to work to be machined independently of said driving means, and a mechanism driven by said driving means for gradually reducing the distance between said member and said driving means at a definite feed rate for meeting said taps.

2. In a tapping unit having a means for driving a plurality of taps, a feed mechanism for said means comprising a lead member movable toward and away from a work part, stop means for locating said lead member relative to work to be machined, and a mechanism driven by said driving means for alternately gradually reducing and increasing the distance between said member and said means at a definite rate independently of said taps for feeding and removing said taps relative to said work.

3. In a combined drilling and tapping unit, a mechanism for performing the drilling operation, means carried by said mechanism for performing the tapping operation, positive feed means for said tapping means including a lead member and a stop means for locating said lead member relative to the work to be machined, a compressed resilient member inter-engaging said mechanism and said tapping means for urging said tapping means towards said member, and a mechcanism driven by said tapping means cooperating with said resilient member to yield gradually to the pressure thereof, whereby said feed tapping means advances towards the work at a predetermined rate.

4. In a combined drilling and tapping unit, a mechanism for performing the drilling operation, means carried by said mechanism and movable relative thereto for performing the tapping operations at an angle to said drilling operation, a feed means for said tapping means comprising a lead member, stop means for locating said lead member relative to work to be machined, a compressed resilient member inter-engaging said mechanism and said tapping means for urging said tapping means towards said member, and a mechanism driven by said tapping means cooperating with said resilient member to yield gradually to the pressure thereof, whereby said feed tapping means advances towards the work at a predetermined rate.

5. In a combined traversable drilling and tapping unit, a drill head means for performing the tapping operation movable relative to and carried by said drill head, a feed mechanism for said means comprising a threaded lead member for locating said means relative to work to be machined upon the forward movement of said drill head, and a correspondingly threaded rotatable member driven by said tapping means for gradually reducing the distance between said member and said means in a manner providing a definite feed rate therebetween independent of said drilling.

6. In a combined traversable drilling and tapping unit, a drill head and prime mover therefor, means for performing the tapping operation movable relative to and carried by said drill head, a feed mechanism for said means comprising a lead member, stop means engaging said lead member for locating said means relative to work to be machined upon the forward movement of said drill head, and having threaded apertures therein, and correspondingly threaded tap spindles driven by said tapping means and engaging in said threaded apertures for providing a linear feed rate for said tapping means and said spindles independent of the movement of said drill head.

7. In a machining apparatus of the class described, a drilling mechanism, a tapping mechanism, said mechanisms being movably mounted relative to each other one upon the other, means for traversing said mechanisms together, feed means for said drilling mechanism, independent mechanism positioned by said drilling mechanism relative to work parts during the feed of said drilling mechanism, lead screw means driven by said tapping mechanism for feeding said tapping mechanism to said work, means for driving said mechanisms, and interlocking means controlling said driving means and said feed means to operate said tapping and drilling means independently of each other with overlapping feed cycles.

8. In a machine tool, a tap head, a plurality of taps driven and supported against axial displacement by said head, means rotatably supporting said taps against radial displacement and movable relative to said head, means for locating said tap supporting means relative to a work part to be machined, and feed means varying the distance between said tap head and said tap supporting means for feeding said taps into said work part.

9. A machine tool having a work table and comprising, in combination, a tool unit, means for feed traversing said table and tool unit relative to each other at a predetermined rate, a second tool unit and drive therefor carried by the first tool unit, said second tool unit being movable relative to the first tool unit and traversable therewith, abutment means for locating said second tool unit relative to said work table independently of said first unit during the feed movement of the first tool unit, means for driving and feeding said second unit at a feed rate slower than said first feed rate, and interlocking control means for operating said tool units simultaneously with overlapping work cycles.

10. A machine tool having a work table and comprising, in combination, a tool unit, means for feed traversing said table and tool unit relative to each other at a predetermined rate, a second tool unit and drive therefor movably carried by the first tool unit and traversable therewith, resilient means interposed between said tool units for urging said second tool unit in the direction of the feed traverse of said first unit, means for indexing said second tool unit relative to said work table, means for feed traversing said second unit at a rate slower than said first feed traversing rate, and interlocking control means for synchronizing the operation of said tool units for simultaneous operation with overlapping work cycles.

11. A machine tool having a work table comprising, in combination, a tool unit, means for feed traversing said table and tool unit relative to each other at a predetermined rate, a second tool unit and drive therefor movably carried by the first tool unit and traversable therewith, resilient means interposed between said tool units for urging said second tool unit in the direction of the feed traverse of said first unit, abutment means engaging said second tool unit in opposition to said resilient means for indexing said second tool unit relative to said work table, means for feed traversing said second unit at a rate slower than said first feed traversing rate, and interlocking control means for synchronizing the operation of said tool units for simultaneous operation with overlapping work cycles.

12. A machine tool having a work table and comprising a drilling unit with ways thereon, means for traversing said work table and drilling unit at rapid and feed forward traverses relative to each other in a direction parallel with said ways, a tapping unit including a reversible drive mounted on said ways for movement with said drilling unit on the rapid forward traverse thereof, means yieldingly urging said tapping unit forwardly on said drilling unit, means for feed traversing said tapping unit at a rate independent of the feed traverse of said drilling unit, means for work indexing said tapping unit upon the forward movement of the drilling head, and interlocking control means for synchronizing the operation of the work cutting cycles of said units for simultaneous operation with independent overlapping feed cycles.

13. A machine tool having a work table, and comprising a drilling unit with ways thereon, means for traversing said work table and drilling unit relative to each other at rapid and feed forward traverses, a tapping unit mounted on said ways for movement with said drilling unit on the rapid forward traverse thereof, means yieldingly urging said tapping unit forwardly on said drilling unit, individual lead screw means for feed traversing said tapping unit at a rate independent of the feed traverse of said drilling unit, means for work indexing said independent lead screw feed means upon the forward traverse of the drilling head, and interlocking control means for synchronizing the operation of the work cutting cycles of said units for simultaneous operation with overlapping feed cycles.

14. A machine tool having a work table, and comprising a drilling unit with ways thereon, means for traversing said work table and drilling unit relative to each other at rapid and feed forward traverses, a tapping unit and reversible drive therefor mounted on said ways for movement with said drilling unit on the rapid forward traverse thereof, tension means interengaging said units and yieldingly urging said tapping unit forwardly on said drilling unit, a plurality of taps carried and driven by said tapping unit, independent lead screw means for feeding said taps, means cooperating with said yielding means for indexing said independent lead screw means relative to said work table upon the forward traverse of the drilling unit, the traversing of said drilling unit operating to increase the pressure of said tension means for maintaining said lead screw means and said indexing means in cooperative relation, and interlocking control means for synchronizing the operation of the work cutting cycles of said units for simultaneous operation with overlapping feed cycles.

15. A machine tool having a work table and comprising, in combination, a tool unit, means for feed traversing said table and tool unit relative to each other at a predetermined rate, a second tool unit and drive therefor carried by the first tool unit, said second tool unit being movable relative to the first tool unit, and traversable therewith, means for locating said second tool unit relative to said work table independently of said first tool unit, means for driving and feeding said second unit at a linear feed rate slower than said first feed rate, and interlocking control means for operating said tool units simultaneously with overlapping work cycles.

HOWARD CREGAR.